United States Patent
Eatough

(10) Patent No.: US 7,624,423 B1
(45) Date of Patent: Nov. 24, 2009

(54) SYSTEMS AND METHODS FOR SOFTWARE DISTRIBUTION USING DISTRIBUTION POLICIES

(75) Inventor: David A. Eatough, Herriman, UT (US)

(73) Assignee: LANDesk Software, Inc., South Jordan, UT (US)

( * ) Notice: Subject to any disclaimer, the term of this patent is extended or adjusted under 35 U.S.C. 154(b) by 852 days.

(21) Appl. No.: 11/039,044

(22) Filed: Jan. 20, 2005

(51) Int. Cl.
G06F 17/00 (2006.01)
G06F 17/30 (2006.01)

(52) U.S. Cl. .................... 726/1; 726/3; 726/6

(58) Field of Classification Search .......... 726/1, 726/3, 6
See application file for complete search history.

(56) References Cited

U.S. PATENT DOCUMENTS 6,678,888 B1 1/2004 Sakanishi

2003/0050955 A1 3/2003 Eatough et al.

OTHER PUBLICATIONS

An Efficient Metadata Distribution Policy for Cluster File Systems, Jin Xiong; Rongfeng Tang; Sining Wu; Dan Meng; Ninghui Sun; Cluster Computing, 2005. IEEE International, Sep. 2005 pp. 1-10.*
Policy-driven multifile distribution, Rosenberg, C.; Pons, P.; Xu, D.; Quality of Service, 2004. IWQOS 2004. Twelfth International IEEE Workshop on Jun. 7-9, 2004 pp. 193-197.*
A weakly coupled adaptive gossip protocol for application level active networks, Wokoma, I.; Liabotis, I.; Prnjat, O.; Sacks, L.; Marshall, I.; Policies for Distributed Systems and Networks, 2002. Proceedings. Third International Workshop on Jun. 5-7, 2002 pp. 244-247.*
Internet News, article Symantec snaps up ON Technology, Clint Boulton, Oct. 2003).*

* cited by examiner

Primary Examiner—David Y Jung
(74) Attorney, Agent, or Firm—Austin Rapp & Hardman

(57) ABSTRACT

A method for using a policy for software distribution to computer systems on a computer network is disclosed. A first policy for software distribution is created. Software is provided on a first computer system to be distributed to a second computer system. The first policy to be used in distributing the software is identified. The software to be distributed is identified. The software to computer systems or groups is distributed.

8 Claims, 8 Drawing Sheets

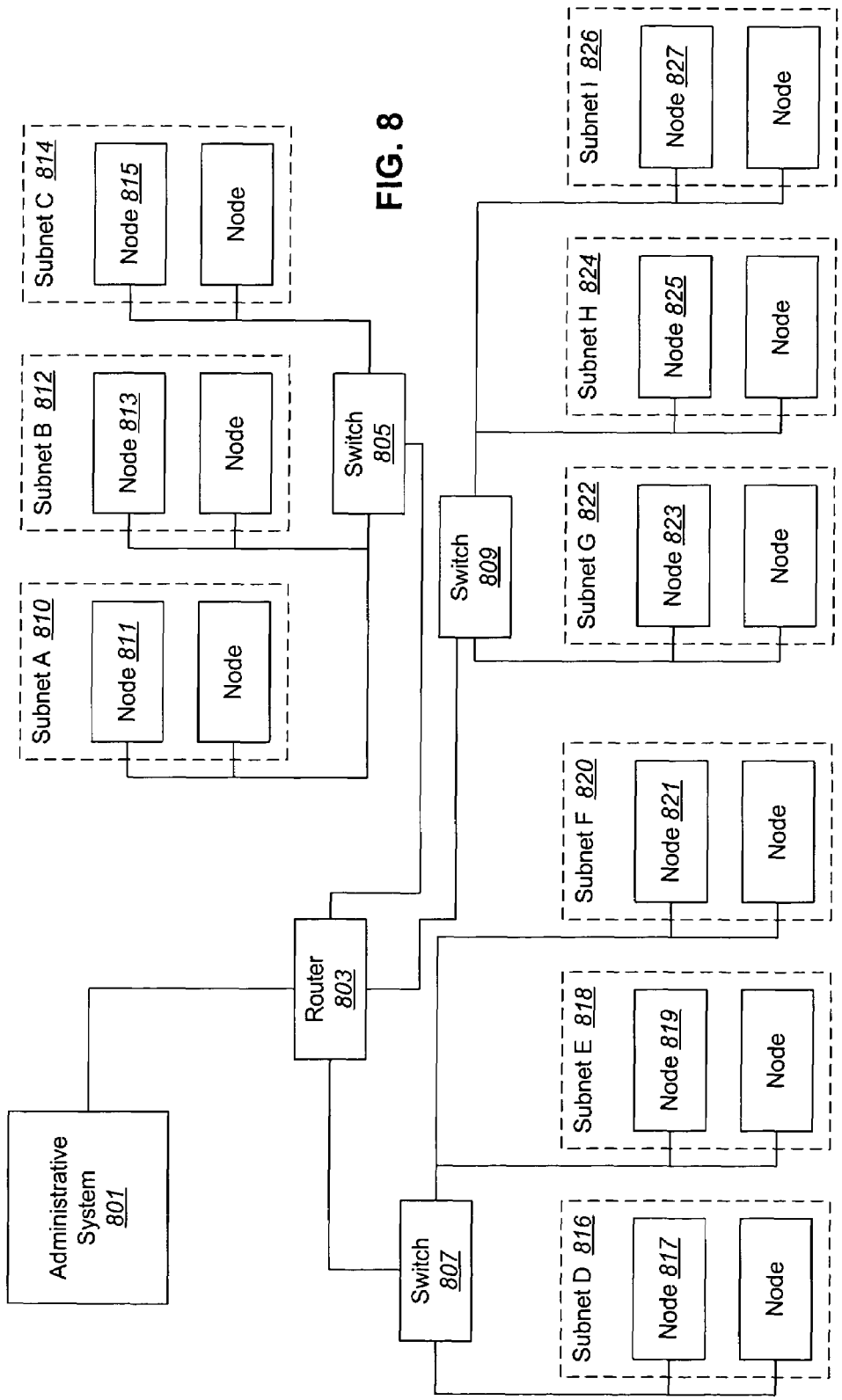

SYSTEMS AND METHODS FOR SOFTWARE DISTRIBUTION USING DISTRIBUTION POLICIES

TECHNICAL FIELD

The present invention relates generally to computer system administration. More specifically, the present invention relates to systems and methods for distributing software according to software distribution policies.

BACKGROUND

Computer and communication technologies continue to advance at a rapid pace. Indeed, computer and communication technologies are involved in many aspects of a person's day. For example, many devices being used today have a small computer inside of the device. These small computers come in varying sizes and degrees of sophistication. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. Most companies have one or more computer networks and also make extensive use of the Internet. The productivity of employees often requires human and computer interaction. Improvements in computers and software have been a force for bringing about great increases in business and industrial productivity.

Maintaining and supporting computer systems is important to anyone who relies on computers. Whether a computer or computing device is in a home or at a business, at least some maintenance and/or support is often needed. For example, sometimes there are problems with computer hardware. In addition, computer hardware is often upgraded and replaced with new components. Similarly computer software is also frequently upgraded or replaced. New computer hardware and software is continually being integrated into systems across the world.

Installing new software or updating current software is typically an ongoing task. Sometimes installing new software may take a substantial amount of time to perform. In addition, if mistakes are made during installing, problems may occur thereafter which could decrease the production of an employee. As corporate performance and end-user productivity have become increasingly dependent on computers, computer support personnel are often used to maintain computers for a company. The support personnel are also under pressure to perform tasks as efficiently as possible which may include minimizing effects to existing computer systems or minimizing any disturbance of computer users.

There are many computer programs now available to help computer support personnel to provide computer support and maintenance. Some of these programs can effectively install new software and/or operating systems by copying certain data to the storage device of the computer system. Copying data to the storage device of the computer system to place updated or different software to the system may be referred to as imaging or disk imaging. Imaging enables computer support personnel to upgrade, update or change a system faster than if he or she had to do it manually.

As shown from the above discussion, there is a need for systems and methods that will improve the ability to manage and support computer systems. Improved systems and methods may enable a person performing computer support to work more efficiently and accomplish more in less time. Benefits may be realized by providing increased functionality to assist in computer maintenance and support.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

FIG. 8 is an exemplary block diagram illustrating a computer network on which the present systems and methods may be implemented.

DETAILED DESCRIPTION

Figure 1:
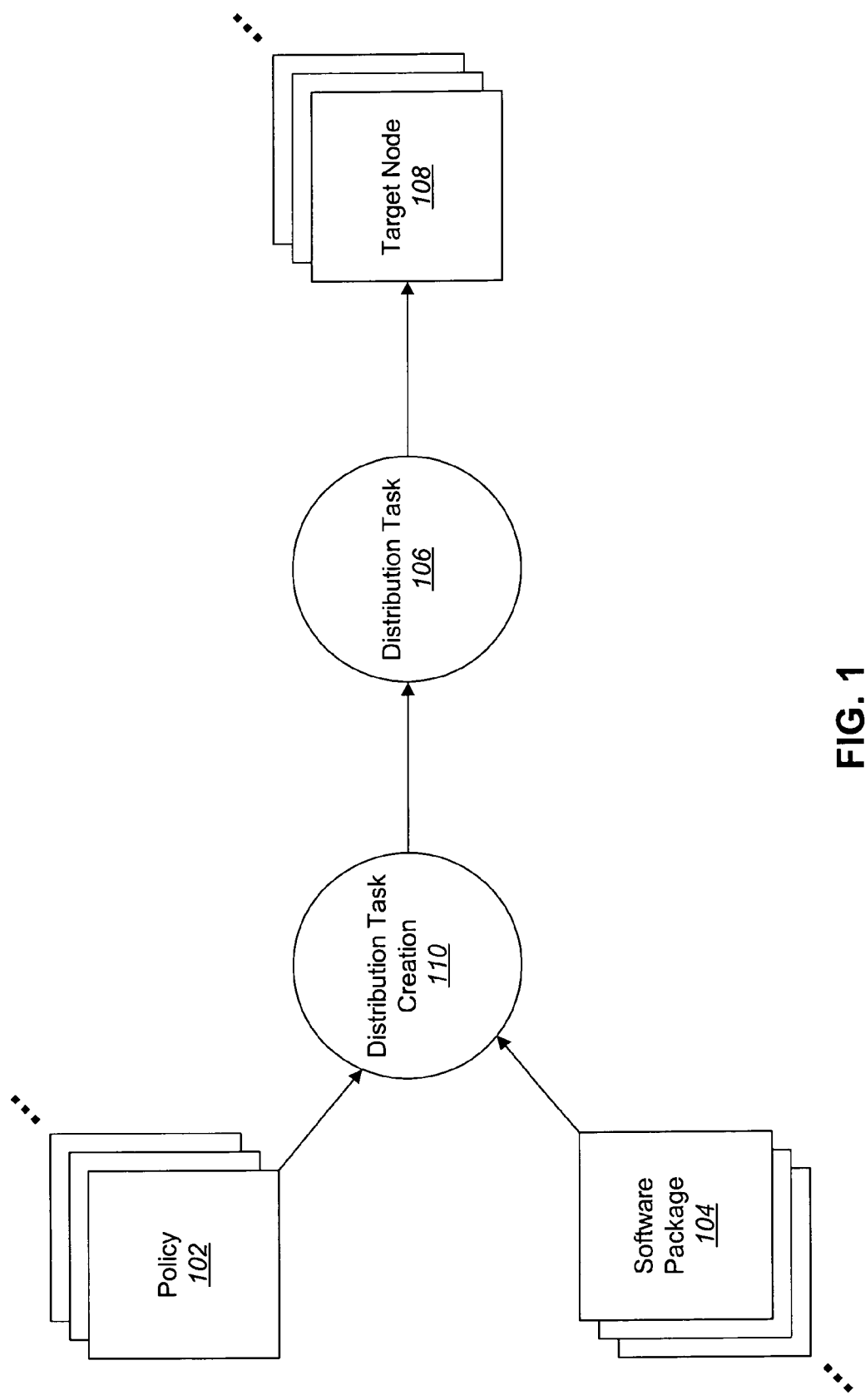
FIG. 1 is a block diagram illustrating the use of a software distribution policy in the distribution of software.

A method for using a policy for software distribution to computer systems on a computer network is disclosed. A first policy for software distribution is created. Software is provided on a first computer system to be distributed to a second computer system. The first policy to be used in distributing the software is identified. The software to be distributed is identified. The software to computer systems or groups is distributed. In one embodiment of the method, the computer systems or groups may be identified.

In an embodiment, the first policy may define that the software is first pushed to the computer systems or groups and then the software is pulled by those computer systems or groups that have not yet received the software. In another embodiment, the first policy may define that the software is first pulled by the computer systems or groups and then the software is pushed to those computer systems or groups that have not yet received the software. In a still yet further embodiment, the first policy may define that the software is made available for an optional pull by the computer systems or groups and then, after some period of time, the software is pushed to those computer systems or groups that have not yet received the software.

The first policy may further define that failed pushes are converted to required pulls. In addition, the first policy may define a staggered distribution wherein the software is distributed incrementally to the computer systems or groups. In one embodiment, the staggered distribution staggers the number of distributions over a predefined period of time.

The first policy also may be used to define one or more time periods. Furthermore, the first policy may also define push segments, pull segments and/or a priority. The policies may comprise push logic and/or pull logic.

The policy may support multicasting the package before installing the package, and the first policy may be used to distribute several distribution packages. In one example, the software is only multicast to the computer systems and not installed by the first policy, and a second policy is used to install the software originally multicast by the first policy. In this example the first and second policies are used to distribute several distribution packages. In some embodiments policies can be used in deploying multiple packages (that is the same distribution policy can be used to create distribution tasks for several distribution packages). In addition, multiple policies may be used to distribute the software. Thus, there may be a loose coupling between the software packages and the policies.

A computer-readable medium for storing program data is also disclosed. The program data comprises executable instructions for implementing a method for using policies for software distribution to computer systems on a computer network. A user interface is provided to a user for creating a software distribution policy. User input is received through the user interface for defining the software distribution policy. The software distribution policy is saved. A policy selection is received from the user to identify a first policy to be used. A software selection is received from the user to identify the software to be distributed. The software is distributed according to the first policy to computer systems or groups. In one embodiment, a group selection may be received from the user identifying the computer systems or groups.

A system for using a policy for software distribution to computer systems on a computer network is also disclosed. An administrative computer system is in electronic communication with a computer network. The administrative computer system includes a computer-readable medium that is part of the administrative computer system or is in electronic communication with the administrative computer system. The computer-readable medium comprises instructions for the administrative computer system to implement a method for using a policy for software distribution to computer systems on a computer network. A user interface is provided to a user for creating a software distribution policy. User input is received through the user interface for defining the software distribution policy. The software distribution policy is saved. A plurality of software distribution policy identifications are displayed to the user. A policy selection is received from the user to identify a first policy to be used. A software selection is received from the user to identify the software to be distributed. The software is distributed according to the first policy to computer systems or groups. In an embodiment the computer-readable medium may further include a plurality of software distribution policies.

It will be readily understood that the components of the embodiments as generally described and illustrated in the Figures herein could be arranged and designed in a wide variety of different configurations. Thus, the following more detailed description of the embodiments of the systems and methods of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Several aspects of the embodiments described herein will be illustrated as software modules or components stored in a computing device. As used herein, a software module or component may include any type of computer instruction or computer executable code located within a memory device and/or transmitted as electronic signals over a system bus or network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction, or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Note that the exemplary embodiment is provided as an exemplar throughout this discussion, however, alternate embodiments may incorporate various aspects without departing from the scope of the present invention.

The order of the steps or actions of the methods described in connection with the embodiments disclosed herein may be changed by those skilled in the art without departing from the scope of the present invention. Thus, any order in the Figures or detailed description is for illustrative purposes only and is not meant to imply a required order unless explicitly stated herein.

Although the embodiments herein are described with reference to multicast jobs, they may be applied to broadcast jobs, point to multipoint, and multipoint to multipoint jobs as well.

Most organizations have their own practices for distributing software throughout their enterprise, these processes are often based on the need to use the network efficiently or to limit the potential impact on the organization. The embodiments herein provide systems and methods that ease the process of distributing software and allow administrators to adapt the solution to their own preferred practices. These embodiments allow the administrator to build a set of business logic that can then be applied to specific targets and packages in order to distribute the packages in accordance with the policies of the organization. This set of business logic is referred to as a software distribution policy.

FIG. 1 shows the basic concept of how a software distribution policy 102 is used to distribute a software package 104. The administrator creates a set of policies 102 that allow him or her to specify how software and/or applications 104 should be distributed within the organization. When the time comes to create a software distribution task 106 the administrator undertakes a distribution task creation 110 which includes selecting one of the policies 102 created, the software package 104 to be distributed, and the target nodes 108. These are then combined to create a software distribution task 106. The software distribution task 106 is then carried out and the software package 104 is distributed accordingly. The software distribution task 106 is any kind of computer instruction or instructions which are carried out in order to distribute the software package 104. Examples of software distribution tasks 106 include, but are not limited to, scripts, executable programs, single commands, batch files, etc.

Policies 102 for software distribution allow the administrator to specify how the job is to be performed. This can include options for replicating the package to staging servers, multicasting the data, and pushing or pulling the package, as well as specifying whether or not the deployment should occur before the actual installation is started. It can also include how many machines at a time should be processed. Because the distribution policy is a set of business logic it can be expanded to include new technologies of distributing the package as they become available.

By allowing the administrator to create multiple policies 102 that control how the package 104 is distributed the process 110 of creating a software distribution task 106 is simplified. The administrator only needs to select the software package 104, target nodes 108, and the policy 102 which is to be used for distributing. The policy 102 then makes sure that the software distribution occurs as previously outlined by the administrator. The result is an easy to use system that provides the flexibility to adapt to the business needs.

Figure 2:
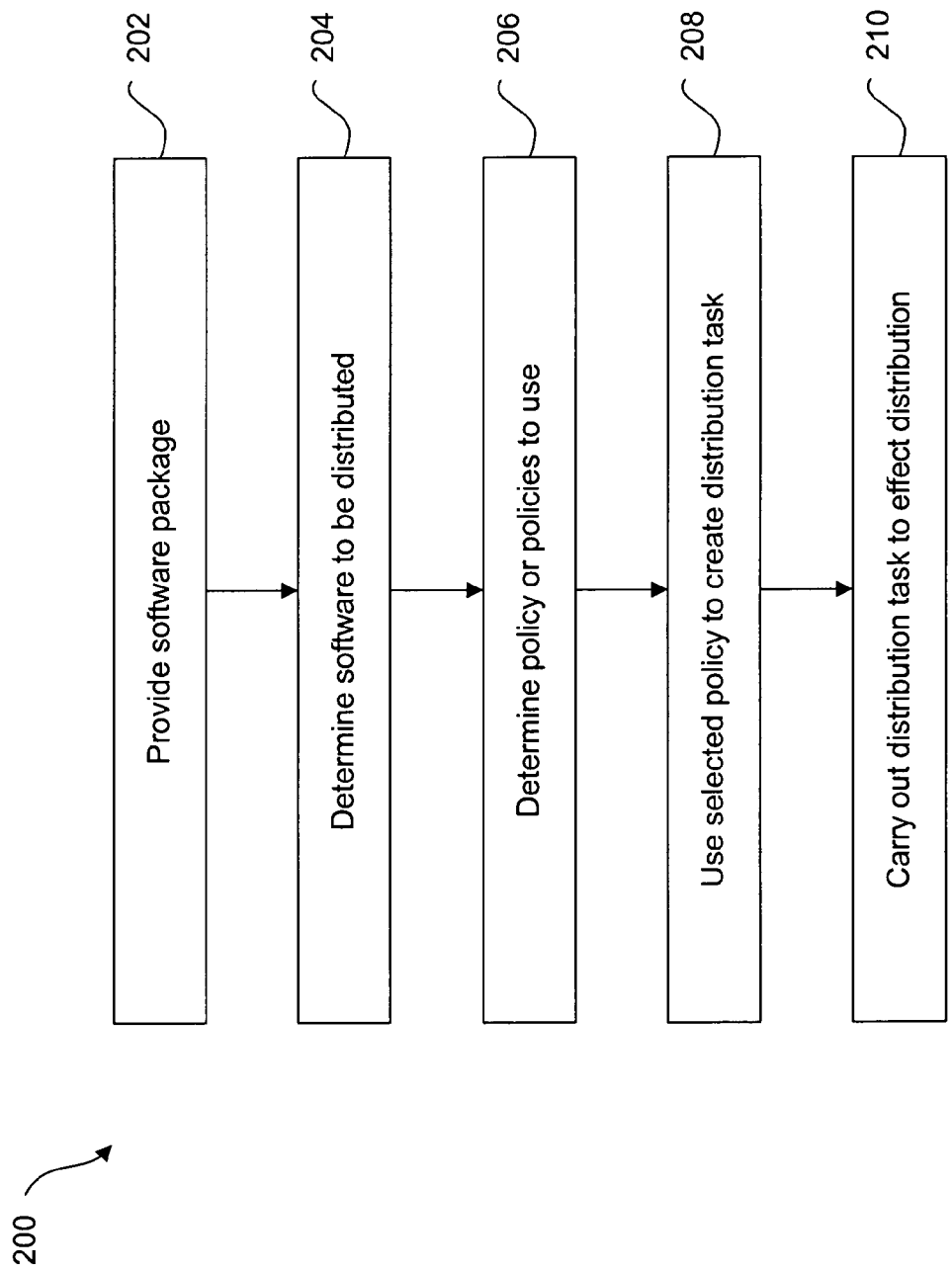
FIG. 2 is a flow diagram illustrating a general method for using policies to effect software distribution.

FIG. 2 is a flow diagram illustrating a general method 200 for using policies to effect software distribution. The software package is made available or provided 202 to the administrator or to the administrative system whereby the administrator becomes aware of the new package that may need to be distributed. Multiple pieces of software may be made available. The software to be distributed is then determined 204. The policy to be used is then determined 206. The policy may be determined in various ways. For example, the administrator may define a policy for normal distribution and one for high priority distributions. Or certain software packages may have defined policies (e.g., Microsoft Word related software packages may have their own policy). Another example is that different kinds of software may have defined policies (e.g., accounting software may have its own policy). Policies may be defined based on software and/or hardware manufacturer. An administrator may also define policies based on his or her particular corporate environment. Further details about policies and examples of policies will be shown below. Once the policy is determined, it is used 208 to create a distribution task. A distribution task is one or more instructions for achieving software distribution. The distribution task may be carried out 210 by one or more administrative systems.

Figure 3:
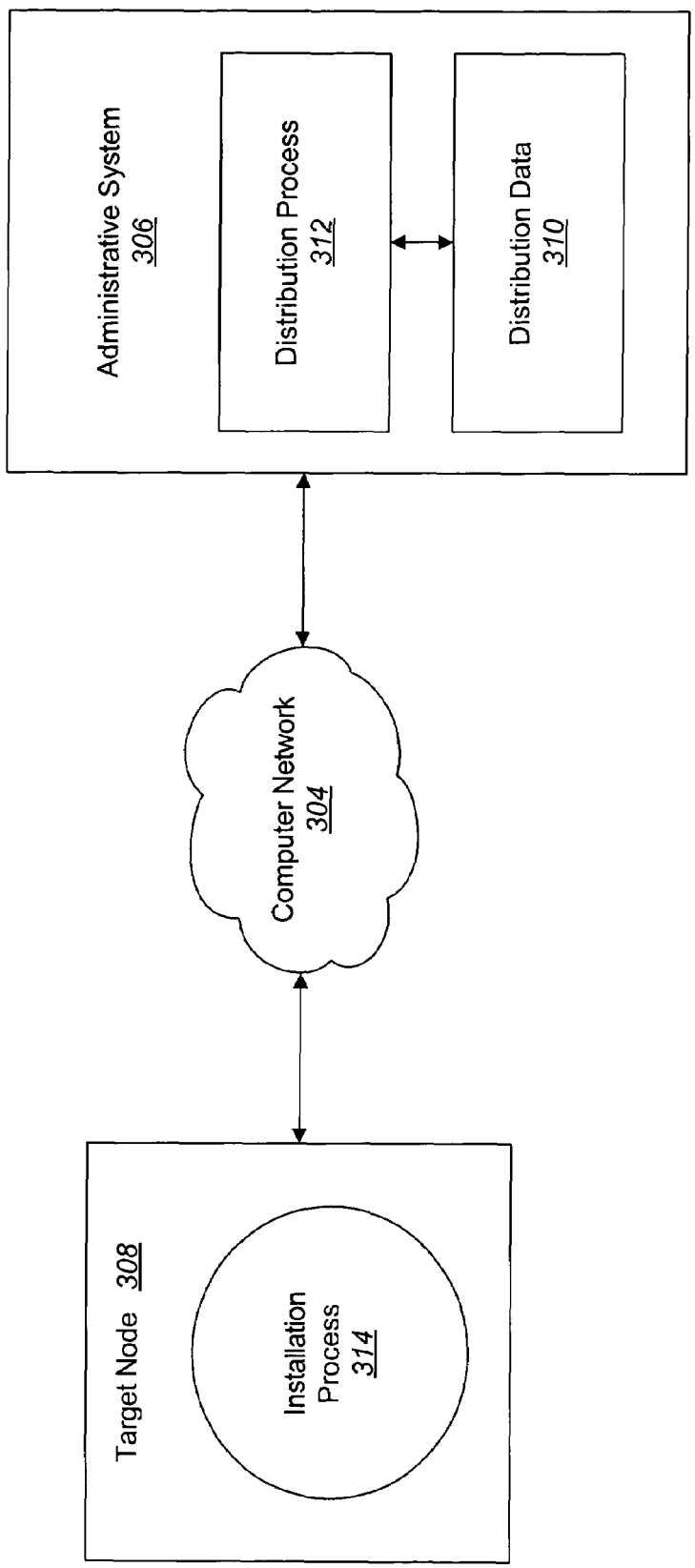
FIG. 3 is a network block diagram of distribution data being sent to a target computer system.

Software distribution may be accomplished in various ways. A general block diagram of software distribution is shown in FIG. 3. FIG. 3 is a network block diagram of distribution data 310 being sent to a target computer system 308. The target computer system 308 is in electronic communication with a computer network 304. In addition, an administrative system 306 is also in electronic communication with the computer network 304.

In many contexts, administrators of a computer network are responsible for installing software on computers that are on the computer network. Administrators may help achieve this by using one or more pieces of data, software packages and/or images that may be sent to, installed on and/or copied to one or more target computer systems.

Usually a new software package or update is initially on the administrative system 306. The software or data to be distributed is referred to as distribution data 310. The distribution data 310 is sent to the target computer 308 where it is installed, written or stored to a hard drive. The distribution data 310 may be used to install new, updated or different software and/or operating systems by copying certain data to the storage device of the target computer system 308. The target computer 308 uses an installation process 314 to install, write, store or otherwise to make the distribution data 310 available for its normal use. The installation process 314 may be an installation program, a script, an imaging tool, a set of commands, a single command, etc. A distribution process 312 on the administrative system transmits the distribution data 310 across the computer network 304 to the target node 308.

Imaging or disk imaging generally refers to a process that can effectively install new, updated or different software and/or operating systems by copying certain data to the storage device of the computer system. For a computer user to install an operating system, the user would typically use one or more CD-ROMs or DVD-ROMs from the manufacturer or software company and walk through the installation process, which is typically interactive. Installing new software is similar in that the user typically uses one or more CD-ROMs or DVD-ROMs to install the software through an interactive installation process. Some software may also be downloaded from the Internet and saved to a file, and then the software may be installed from the saved filed. After something has been installed onto a computer system, a snapshot may be taken of the storage device(s) of the computer system at a certain point in time. This snapshot may be referred to as an image. If the user ever wanted to go back to that state, he or she may simply re-image the drive with the snapshot or image. In addition, other computers with a compatible configuration may also be imaged using that same image to install the same set of software to the computer. Thus imaging enables computer support personnel to upgrade, update or change a system faster than if he or she had to do it manually. The term imaging as used herein is broadly defined as writing a set of data to a storage device to effect a change to the computer system without going through a typical manual installation process. Sometimes the terms restoring, copying or storing are also used to describe an imaging job.

The distribution data 310 is sent to the target computer 308. The distribution data 310 may be sent in a variety of ways. For example, it may be sent via multicast, unicast, broadcast, point to multipoint, and multipoint to multipoint, etc.

Figure 4:
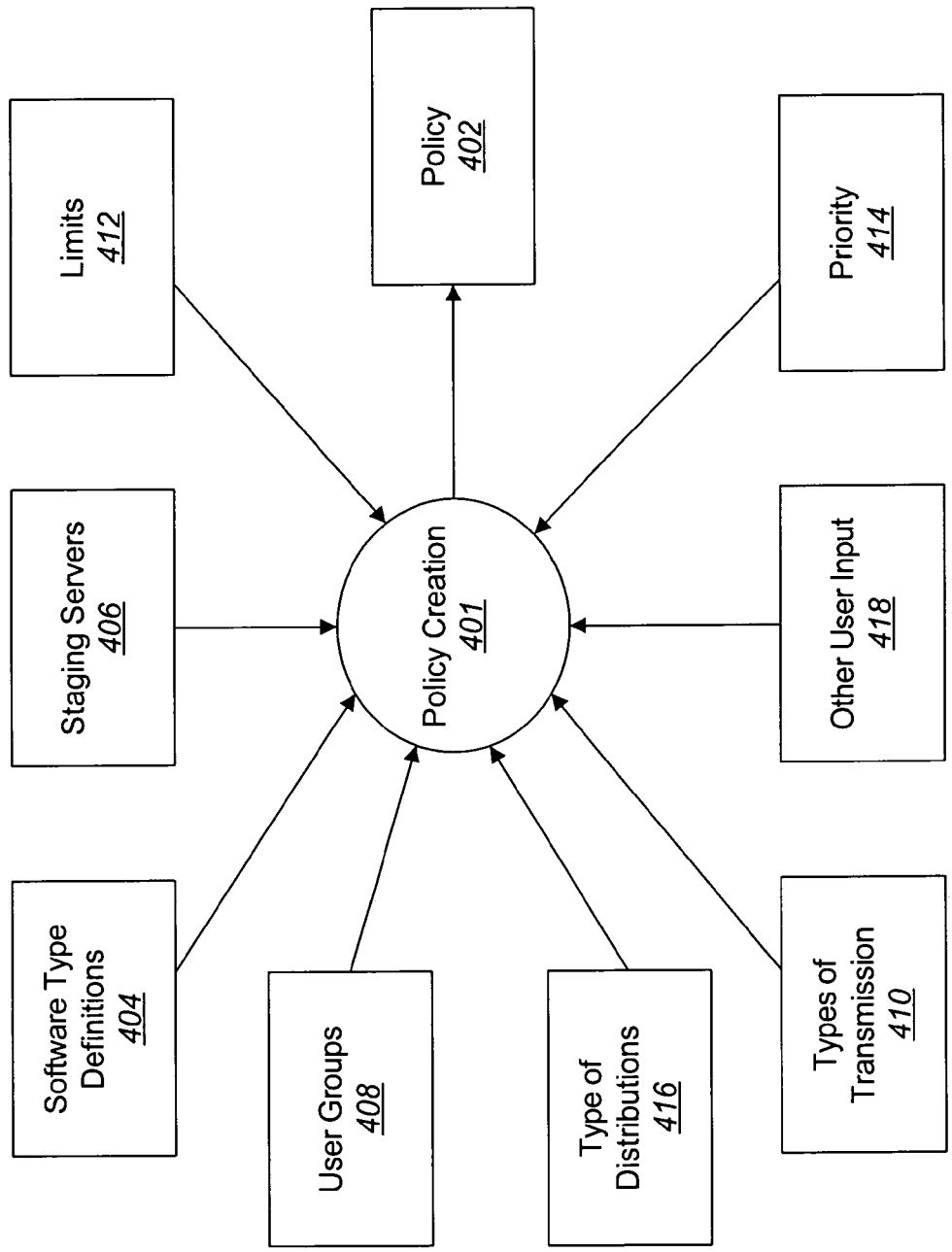
FIG. 4 is a block diagram illustrating the creation of a policy.

FIG. 4 is a block diagram illustrating the creation 401 of a policy 402. An administrator or administrative system may consider many different factors and/or pieces of information when creating a policy 402. Various exemplary inputs are shown to the policy creation process 401. The type 404 of software or a software definition 404 may be input to the policy 402. This may define what kinds of software packages are to use this particular policy 402. Whether the package should be replicated to staging servers 406 and the identifications of any such staging servers may be included.

User groups 408 and/or target nodes may be used in creating a policy 402. The users or target nodes that are to receive the software distribution may be specified. In addition, the order in which the distribution should be achieved among the users can be placed into the policy. The type(s) of transmission 410 may be put into the policy 402 (e.g., broadcast, multicast, etc.). Various limits 412 may also be put into the policy 402. For example, how many target nodes should be distributed to at once, the minimum or the maximum. Any bandwidth limits may also be considered. Time periods within which the distribution should be started and/or completed may also be put into the policy 402. One or more priorities 414 for the policy may also be defined. The type 416 of distribution may also be considered to create the policy. Other user input 418 may also be used.

This system provides the administrator with a method to create a single policy 402 that contains all of the business logic to control how the job goes from push to pull and vice versa. Thus, and as will be shown below, the software distribution may be carried out by a combination of push and pull technologies. The type of distribution input may be used in defining which parts of the distribution are push, which are pull, and how the distribution changes from push to pull and vice versa.

Many other kinds of information or factors may be considered and/or placed into a policy 402. The examples given herein are only examples and are not meant to limit what a policy 402 is. A policy 402 is simply information that defines at least one aspect of how a software distribution is to be achieved. The policy 402 created may be modified and/or deleted.

Many different formats and/or designs for the policy 402 may be implemented. For example, the policy 402 may be an executable program. Furthermore, the policy 402 may be a script that can be executed by an interpreter. In addition, the script can simply be a series of commands that can be executed by a program and/or an operating system. The policy 402 may only include data that is read in by software that creates and/or carries out the distribution task.

Figure 5:
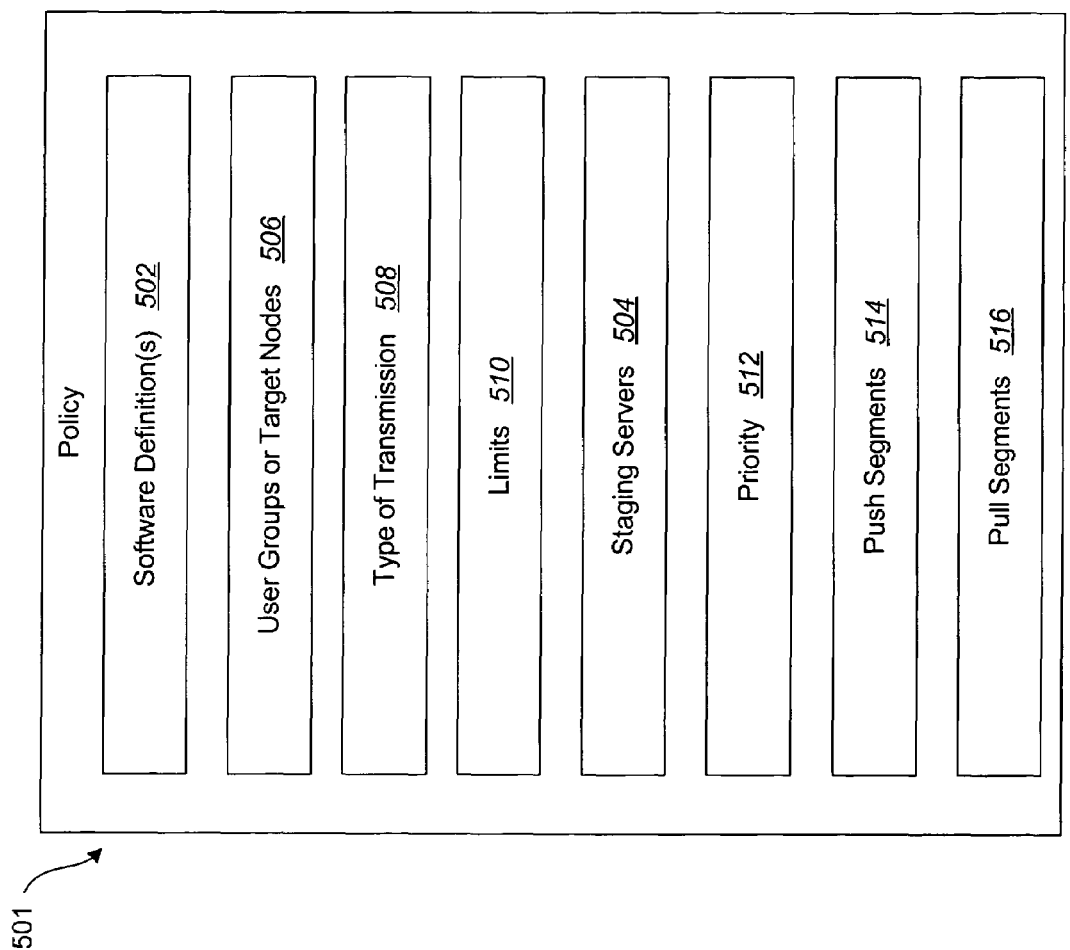
FIG. 5 is a block diagram illustrating one embodiment of a policy structure.

FIG. 5 is a block diagram illustrating one embodiment 501 of a policy structure. The policy 501 may include one or more software definitions 502 that define when the policy 501 should be used. The policy 501 may include an indication 504 as to whether the package should be replicated to staging servers and the identifications of any such staging servers. User groups 506 and/or target node order may also be included in the policy 501, as well as any particular order of or groupings of the users. The policy 501 may also include the type(s) 508 of transmission (e.g., broadcast, multicast, etc.). Various limits 510 may also be put into the policy 501 (e.g., how many target nodes should be distributed to at once, the minimum or the maximum, any bandwidth limits, time period limits, etc.). One or more priorities 512 for the policy 501 may also be in the policy 501. As explained above, many other kinds of information or factors may be considered and/or placed into a policy 501. The policy 501 may include push segments 514 and pull segments 516 that define when push technologies are used, when pull technologies are used, and how the distribution changes from push to pull and vice versa. The examples given herein are only examples and are not meant to limit what a policy 501 is.

Figure 6:
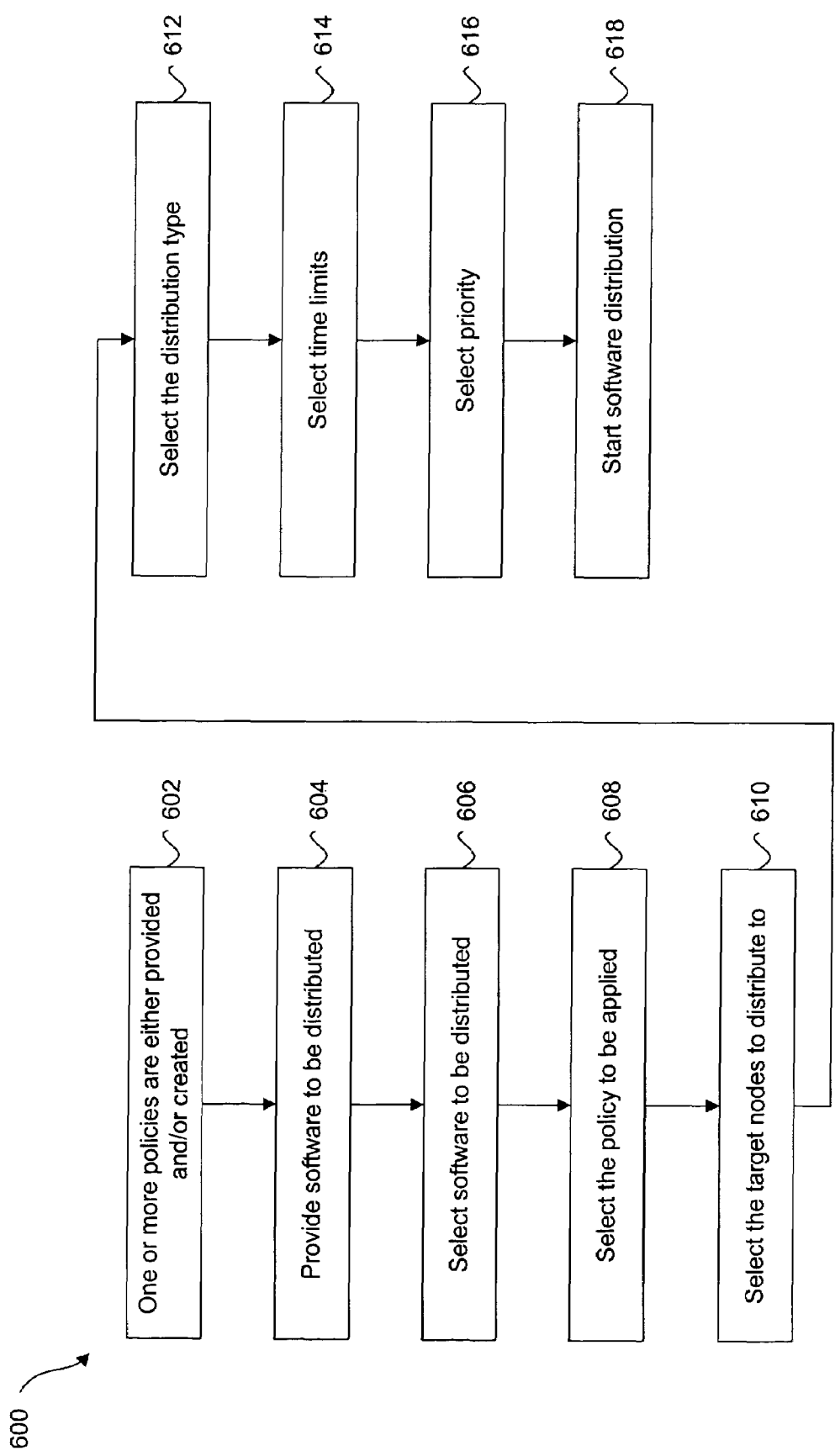
FIG. 6 is a flow diagram of one embodiment of a method for using policies to effect software distribution.

FIG. 6 is a flow diagram of one embodiment 600 of a method for using policies to effect software distribution. In the flow diagram of FIG. 6, the administrator may manually select a number of items that could, in another embodiment, be placed in the policy. In one embodiment, the distribution task creation takes place on a server where the policies are stored. Of course, it is possible that the distribution task may be created on a different system.

One or more policies are either provided and/or created 602. The software to be distributed is also provided 604. Through the use of a graphical user interface, an administrator may select 606 the software to be distributed and may also select 608 the policy to be applied. In this example, the administrator may then manually specify a number of items that either were not in the policy or that the administrator wished to override. The administrator may select 610 the target nodes to distribute to. The type, e.g., push and/or pull, or multicast only, may be defined in the distribution policy. The administrator may further select 614 time limits. The priority may also be defined in the distribution policy. When the administrator is done configuring the distribution task, the software distribution may be started 618. The software used by the administrator to select the items as shown in FIG. 6 may also be used to achieve the software distribution based on the inputs. Thus, the software may enable an administrator to define a distribution task through a graphical user interface and the software may then carry out the task.

Various examples of how the current systems and methods may be used for software distribution will now be given. The following are examples of software distribution policies and the business logic they contain.

Push to Pull Example

As noted in method and apparatus to perform automated task handling, U.S. Patent Application, Publication No. 20030050955, filed Jun. 26, 2001, which is incorporated herein by reference, a higher success rate can be obtained when a push distribution is followed up by a pull distribution. The following software distribution policy allows the administrator to express this, as shown in the following pseudo code:

Package is pushed to all target nodes using multicast
    for each target node that has not installed the package
        convert method to a required pull for the target node(s)

This policy provides the benefits of both push and pull distribution without the administrator having to manually sort out which target nodes failed to receive the package using the push distribution.

Pull to Push Example

In this example the administrator creates a policy that facilitates early adopters of the application. This policy is shown in the following logic:

Package is made available for optional pull
    After package has been made available for a month
        for each target nodes that has not installed the package
        push package to target node(s)
        for each target node that push failed
            convert to a required pull for the target node(s)

This policy allows the administrator the flexibility of allowing those interested users the opportunity to install the application before the general installation in the enterprise. It also preserves the benefits of both the push and pull distribution technologies.

Staggered Distribution Example

Organizations often need to consider the impact that distributing software can have on the enterprise. For example if the installation of software causes a problem for the end user needs a call to the help desk will occur. To prevent the overwhelming of the help desk the installation of the application is staggered over a period of time as shown in the following logic:

Package is pushed to 200 of the target nodes
    for each target node above that has not installed the package
        convert to a required pull for the target node(s)
    After one week from the initial push
        once per weekday push the package to an additional 200 nodes
        for each target nodes that has not installed the package
            convert to a required pull for the target node(s)

This policy allows the administrator to stagger the distribution of the package in such a way that it will not overwhelm the help desk. The administrator does not need to continually create new tasks to push the package to the additional nodes, the system automates this process. If however a problem occurred with the first 200 machines that received the package the administrator can easily cancel the task and prevent additional machines from receiving the package. The selection of the initial nodes can be done at random or the administrator can specify a pilot group from which the pilot machines are to be selected.

High Priority Distribution Example

There are also situations, such as updating a virus pattern file, which require the ability to distribute the package to a large number of nodes as quickly as possible. In this situation the administrator needs the ability to specify a policy that prioritizes the package as more important than normal business operations. This policy is shown in the following logic:

Push package to all target nodes
    After two hours a push attempt to failed nodes are made
    After four hours another push attempt to failed nodes is made
    for each target nodes that has not installed the package
        convert to a high priority required pull for the target node(s)

This policy allows the administrator to rapidly deploy an urgent update to the organization.

Organizations often build strategies for software distribution. These strategies are designed to allow the administrator to balance the need for distributing software and maintaining the ability to perform business. To better understand the advantages provided by distribution profiles two common software distribution cases will be considered. The first case is distributing an application, such as Microsoft Word 2000, to a large number of machines. The second is when distributing a critical patch, such as a patch to protect computers from the Nimda virus, to a large number of machines.

In the first case it is assumed that the organization's help desk could be overwhelmed if software was distributed to more than 500 workstations at a time. In a traditional product where the administrator can schedule tasks, the administrator typically has two choices: either distribute to all 10,000 machines at once (and run the risk of overwhelming the help desk) or divide the task into smaller tasks (e.g., into 20 tasks of 500 machines each). Additionally the administrator may have to create several distribution tasks to 10,000 machines during the year, forcing him or her to constantly choose between these two choices.

The systems and methods herein solve this problem by allowing the administrator to create a profile that will only distribute to 500 or fewer machines a day until the task is complete. Thus the administrator can select the machines, the appropriate profile, and the software to be distributed and have confidence that the task will be completed without impacting the help desk.

One common solution to this problem is to use a pull technology to distribute the application. For example, MSI packages can be advertised on client machines and then installed when the user accesses them. Policy-based distribution provides a distinct advantage over this method because they can take advantage of multicast technologies for greater network efficiency and provide the administrator with predictability as to when the network will be used for software distribution.

The second use case is distributing a critical application patch to 10,000 machines. Although there are products today that will enable this rapid deployment, they fail to offer the advantages of a staggered distribution. Policies provide the administrator the ability to adapt how the product distributes software to meet the business needs of their organization.

Figure 7:
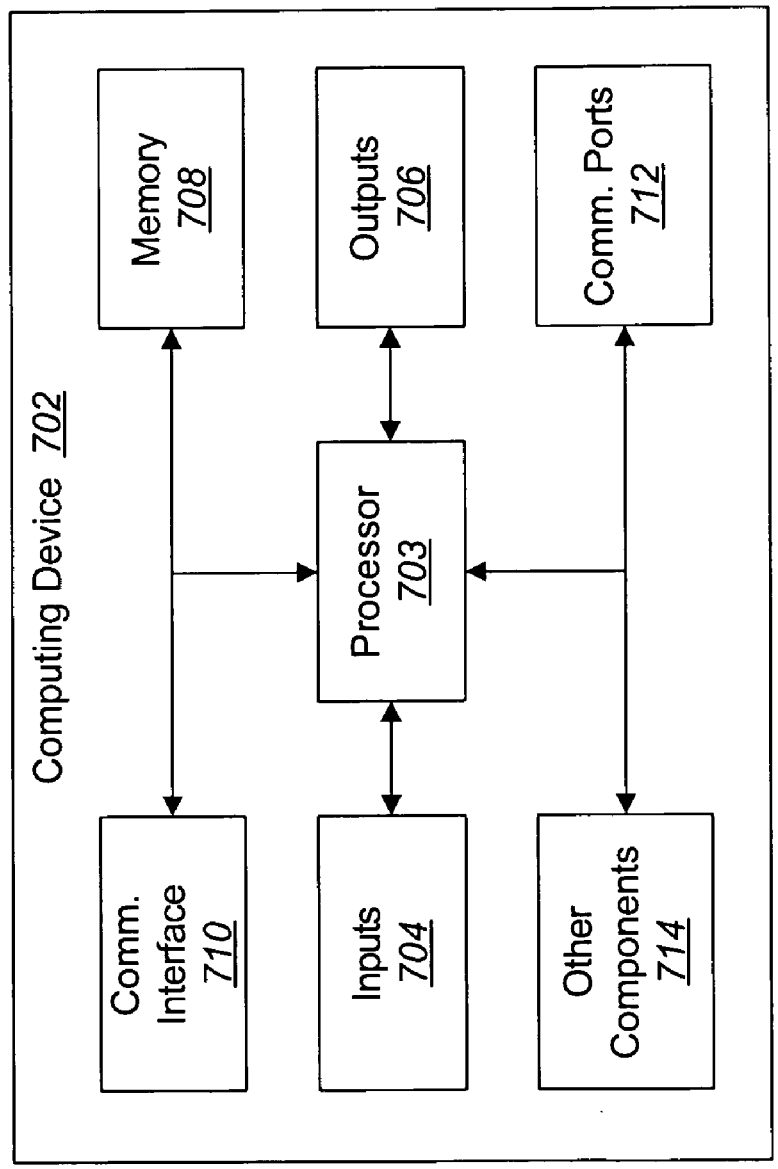
FIG. 7 is a block diagram illustrating the major hardware components typically utilized in a computer or computing device.

FIG. 7 is a block diagram illustrating the major hardware components typically utilized in a target computer or target computing device used with embodiments herein. Computers and/or computing devices 702 are known in the art and are commercially available. The major hardware components typically utilized in a computing device 702 are illustrated in FIG. 7. A computing device 702 typically includes a processor 703 in electronic communication with input components or devices 704 and/or output components or devices 706. The processor 703 is operably connected to input 704 and/or output devices 706 capable of electronic communication with the processor 703, or, in other words, to devices capable of input and/or output in the form of an electrical signal. Embodiments of devices 702 may include the inputs 704, outputs 706 and the processor 703 within the same physical structure or in separate housings or structures.

The electronic device 702 may also include memory 708. The memory 708 may be a separate component from the processor 703, or it may be on-board memory 708 included in the same part as the processor 703. For example, microcontrollers often include a certain amount of on-board memory. The memory 708 may be embodied in RAM, a hard drive, a CD-ROM drive, a DVD-ROM drive, network storage, etc. The memory 708 is broadly defined as any electronic component capable of storing electronic information.

The processor 703 is also in electronic communication with a communication interface 710. The communication interface 710 may be used for communications with other devices 702. Thus, the communication interfaces 710 of the various devices 702 may be designed to communicate with each other to send signals or messages between the computing devices 702. A network card or wireless card may be used to implement a communication interface 710.

The computing device 702 may also include other communication ports 712. In addition, other components 714 may also be included in the electronic device 702.

Of course, those skilled in the art will appreciate the many kinds of different devices that may be used with embodiments herein. The computing device 702 may be a one-chip computer, such as a microcontroller, a one-board type of computer, such as a controller, a typical desktop computer, such as an IBM-PC compatible, a Macintosh based system, a Personal Digital Assistant (PDA), a Unix-based workstation, a router, etc. Accordingly, the block diagram of FIG. 7 is only meant to illustrate typical components of a computer or computing device 702 and is not meant to limit the scope of embodiments disclosed herein.

FIG. 7 illustrates a computer system 702 that includes or is in electronic communication with a machine-readable medium (memory) on which is stored a set of instructions according to embodiments herein. Although described in the context of a computer system 702, the embodiments herein may be implemented in any suitable computer system comprising any suitable one or more integrated circuits.

Accordingly, computer system 702 includes or is in communication with a computer-readable medium on which is stored a set of instructions (i.e., software) embodying any one, or all, of the methodologies described above. For example, software can reside, completely or at least partially, within main memory and/or within processors 703. For the purposes of this specification, the term "computer-readable medium" shall be taken to include any mechanism that provides (i.e., stores and/or transmits) information in a form readable by a machine (e.g., a computer). For example, a computer-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

FIG. 8 is an exemplary block diagram illustrating a computer network on which the present systems and methods may be implemented. In FIG. 8, an administrative system 801 connects to a router 803. The administrative system 801 may be any computer or computing device that has been configured to, or is being used for, receiving notifications from one or more monitors.

The router 803 may be connected to three switches: a first switch 805, a second switch 807 and a third switch 809. Each switch 805, 807, 809 connects to three subnets. The first switch 805 connects to three subnets 810, 812, and 814. The second switch 807 connects to three subnets 816, 818, and 820. The third switch 809 connects to three subnets 822, 824, and 826. The network nodes or elements 811, 813, 815, 817, 819, 821, 823, 825 and 827 represent computer systems or devices on the computer network. One or more of the nodes may use embodiments of the imaging systems and methods herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for using a policy for software distribution to computer systems on a computer network, the method being executable by a processor, the method comprising:
    creating a first policy for software distribution, the first policy being stored in memory coupled to the processor;
    providing software on a first computer system to be distributed to a second computer system;
    identifying the first policy from a plurality of selectable policies to be used in distributing the software;
    identifying the software to be distributed; and
    distributing the software according to the first policy to computer systems or groups, wherein the first policy defines that the software is made available for an optional pull by the computer systems or groups and then, after some period of time, the software is pushed to those computer systems or groups that have not yet received the software,
    wherein the first policy further defines that failed pushes are converted to required pulls.

2. A method for using a policy for software distribution to computer systems on a computer network, the method being executable by a processor, the method comprising:
    creating a first policy for software distribution, the first policy being stored in memory coupled to the processor;
    providing software on a first computer system to be distributed to a second computer system;
    identifying the first policy from a plurality of selectable policies to be used in distributing the software;
    identifying the software to be distributed; and
    distributing the software according to the first policy to computer systems or groups, wherein the first policy defines a staggered distribution wherein the software is distributed incrementally to the computer systems or groups.

3. The method of claim 2, wherein the staggered distribution staggers the number of distributions over a predefined period of time.

4. A method for using a policy for software distribution to computer systems on a computer network, the method being executable by a processor, the method comprising:
    creating a first policy for software distribution, the first policy being stored in memory coupled to the processor;
    providing software on a first computer system to be distributed to a second computer system;
    identifying the first policy from a plurality of selectable policies to be used in distributing the software;
    identifying the software to be distributed; and
    distributing the software according to the first policy to computer systems or groups, wherein the software is only multicast to the computer systems and not installed by the first policy, wherein a second policy is used to install the software originally multicast by the first policy, and wherein the first and second policies are used to distribute several distribution packages.

5. A computer-readable medium for storing program data, wherein the program data comprises executable instructions for implementing policies for software distribution to computer systems on a computer network, the instructions being executable by a processor to:

provide a user interface for creating a software distribution policy, the distribution policy being stored in memory coupled to the processor;

receive input through the user interface for defining the software distribution policy;

save the software distribution policy;

receive a policy selection to identify a first policy from a plurality of selectable policies to be used in distributing software;

receive a software selection to identify the software to be distributed; and distribute the software according to the first policy to computer systems or groups, wherein the first policy defines that the software is made available for an optional pull by the computer systems or groups and then, after some period of time, the software is pushed to those computer systems or groups that have not yet received the software, wherein the first policy further defines that failed pushes are converted to required pulls.

6. A computer-readable medium for storing program data, wherein the program data comprises executable instructions for implementing policies for software distribution to computer systems on a computer network, the instructions being executable by a processor to:

provide a user interface for creating a software distribution policy, the distribution policy being stored in memory coupled to the processor;

receive input through the user interface for defining the software distribution policy;

save the software distribution policy;

receive a policy selection to identify a first policy from a plurality of selectable policies to be used in distributing software;

receive a software selection to identify the software to be distributed; and distribute the software according to the first policy to computer systems or groups, wherein the first policy defines a staggered distribution wherein the software is distributed incrementally to the computer systems or groups.

7. The computer-readable medium of claim 6, wherein the staggered distribution staggers the number of distributions over a predefined period of time.

8. A system for using a policy for software distribution to computer systems on a computer network, the system comprising:

an administrative computer system in electronic communication with a computer network, wherein the administrative computer system comprises a computer-readable medium that is part of the administrative computer system or is in electronic communication with the administrative computer system, the computer-readable medium comprising instructions for the administrative computer system to implement a policy for software distribution to computer systems on a computer network, the instructions being executable by a processor to:

provide a user interface for creating a software distribution policy;

receive input through the user interface for defining the software distribution policy, the software distribution policy being stored in memory coupled to the processor;

save the software distribution policy;

display a plurality of software distribution policy identifications;

receive a policy selection to identify a first policy from a plurality of selectable policies to be used;

receive a group selection identifying computer systems or groups;

receive a software selection to identify the software to be distributed; and distribute the software according to the first policy to the computer systems or groups, wherein the first policy defines that the software is only multicast to the computer systems and not installed wherein a second policy defines installation of the software originally multicast as defined by the first policy, and wherein the first and second policies define distribution of several distribution packages.

* * * * *

UNITED STATES PATENT AND TRADEMARK OFFICE
CERTIFICATE OF CORRECTION

PATENT NO. : 7,624,423 B1
APPLICATION NO. : 11/039044
DATED : November 24, 2009
INVENTOR(S) : David A. Eatough Page 1 of 1

It is certified that error appears in the above-identified patent and that said Letters Patent is hereby corrected as shown below:

In column 14, lines 39-40 please delete "installed wherein" and replace it with --installed, wherein--.

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,624,423 B1  
APPLICATION NO. : 11/039044  
DATED : November 24, 2009  
INVENTOR(S) : David A. Eatough Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1226 days.

Signed and Sealed this

Twenty-first Day of December, 2010

David J. Kappos  
*Director of the United States Patent and Trademark Office*